(No Model.)

I. J. GRAY.
KNOB ATTACHMENT.

No. 427,073. Patented May 6, 1890.

Witnesses
Geo. E. Frech.
N. T. Collamer.

Inventor
Isaac J. Gray
By his Attorneys
C. A. Snow & Co.

UNITED STATES PATENT OFFICE.

ISAAC J. GRAY, OF BELOIT, WISCONSIN.

KNOB ATTACHMENT.

SPECIFICATION forming part of Letters Patent No. 427,073, dated May 6, 1890.

Application filed October 5, 1889. Serial No. 326,077. (No model.)

*To all whom it may concern:*

Be it known that I, ISAAC J. GRAY, a citizen of the United States, residing at Beloit, in the county of Rock and State of Wisconsin, have invented a new and useful Improvement in Door-Knobs, of which the following is a full, clear, and exact description.

My invention relates to door-knobs in general, the object of it being to provide a doorknob which will adjust itself on the spindle according to the thickness of the door without the aid of screw or other device now in use.

For the purpose named the invention consists, essentially, of a spindle on either end of which is arranged a spring turning a dog into ratchet-teeth in a tubular shank to make fast the connection of the spindle when engaged within the shank of the door-knob, all of which will be hereinafter described more fully, and specifically pointed out in the claim.

Reference is to be had to the accompanying drawings, forming a part of this specification.

Figure 1:
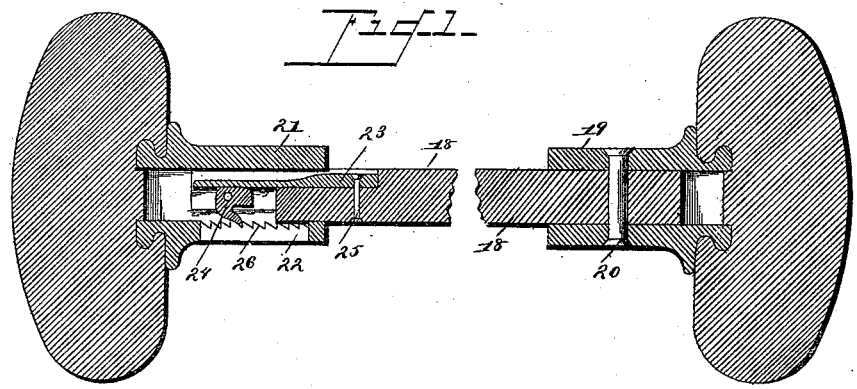
Figure 2:
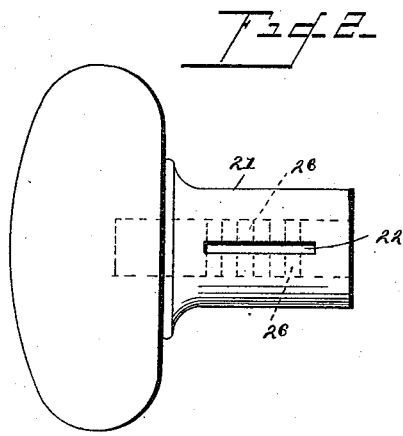

Figure 1 is a central longitudinal section of the spindle engaged with the left knob by my improved spring and dog, the latter fitting into notches within the shank of the knob; and Fig. 2 is a bottom plan of the knob and shank, showing the slot for the insertion of a thin tool for turning said dog.

In the drawings, 18 represents a spindle, to the body of which is riveted the spring 23 by the rivet 25 in such way as to bear directly upon the pivoted dog 24, so as to force its tip into notches 26 on inside of shank 21, thus making fast the connection between spindle and knob until disengaged by pressure brought to bear through slot 22.

19 represents an ordinary shank, which may be used in connection with my invention, if desired, by riveting fast to one end of spindle 18 by the rivet 20.

Although this form of door-knob is styled "self-adjusting," it is apparent that in its application provision will have to be made for the space between the notches in shank. This is done by the use of the ordinary spiral spring made to surround the spindle or the thin metallic washer in common use, either or both of which may be made to serve the desired purpose.

Having thus described my invention, I claim as new and wish to secure by Letters Patent—

The combination, with a door-knob and a tubular shank 21, irremovably secured thereto, said shank having a series of ratchet-teeth 26 on its inner face and a longitudinal slot 22 through its body throughout the length of said series, of a spindle 18, bifurcated at its end, a dog 24, pivoted in said bifurcation, and a spring 23, secured within the spindle, said spring turning the dog into engagement with the teeth, substantially as and for the purpose described.

ISAAC J. GRAY.

Witnesses:
J. B. DOW,
C. D. HARRIS.